United States Patent [19]

Neumann et al.

[11] Patent Number: 4,585,938
[45] Date of Patent: Apr. 29, 1986

[54] SURFACE DEVIATION COMPENSATION FOR A BEAM SCANNING SYSTEM

[75] Inventors: Don B. Neumann, Laguna Beach; Richard P. Eddy, Gardena, both of Calif.

[73] Assignee: Excellon Industries, Calif.

[21] Appl. No.: 573,297

[22] Filed: Jan. 23, 1984

[51] Int. Cl.[4] .............................................. H01J 3/14
[52] U.S. Cl. .................................... 250/235; 358/293
[58] Field of Search ........... 250/234, 235, 236, 237 R, 250/237 G, 560, 561; 358/293; 356/384, 385, 386, 387

[56] References Cited

U.S. PATENT DOCUMENTS 4,447,723  5/1984  Neumann ............................ 250/236
4,523,093  6/1985  Neumann ............................ 358/293

Primary Examiner—David C. Nelms
Assistant Examiner—James Gatto
Attorney, Agent, or Firm—Gausewitz, Carr & Rothenberg

[57] ABSTRACT

The image formed by a laser flying spot scanner on a photosensitive medium is subject to error in size and/or position because of deviation of the photosensitive surface from a nominal position. The deviation will occur if the substrate carrying the photosensitive surface does not have a uniform thickness. In a scanning system having a code mask that produces reference signals for controlling timing of writing beam modulation, compensation for the error is provided by maintaining a fixed distance between the code mask and the surface of the medium. The code mask floats freely upon the medium surface to move up and down with height variations of the surface as the medium passes under the code member and under the writing beam. Alternatively, the platen that supports the photosensitive medium is allowed to float and is continuously urged upwardly against spacing or position sensing devices to maintain the medium surface at a fixed distance from the mask.

30 Claims, 18 Drawing Figures

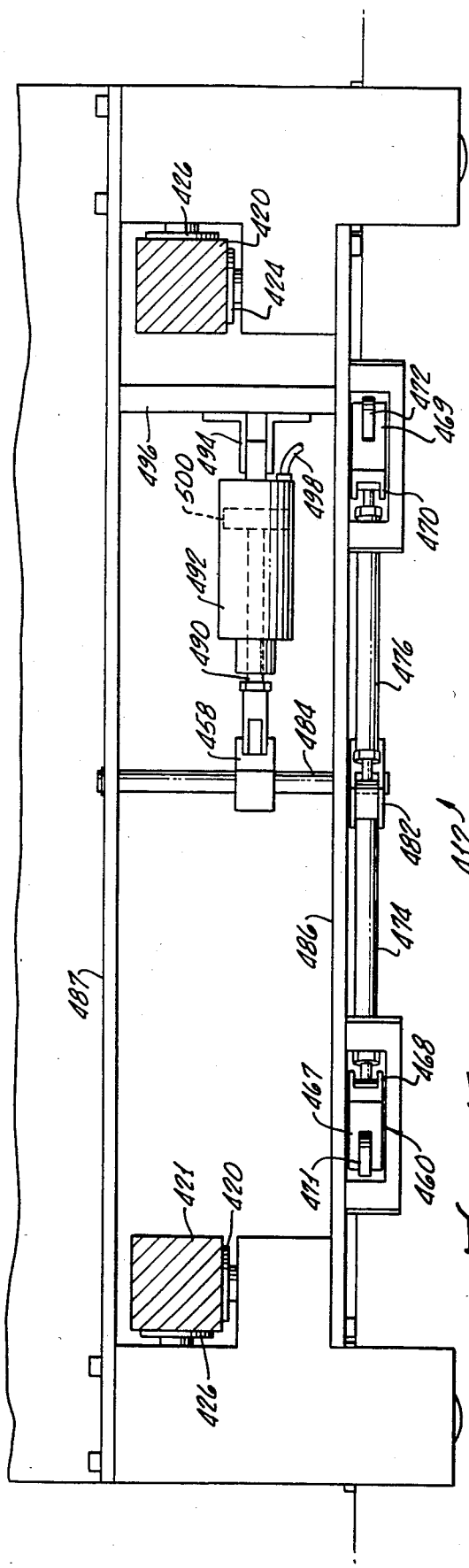
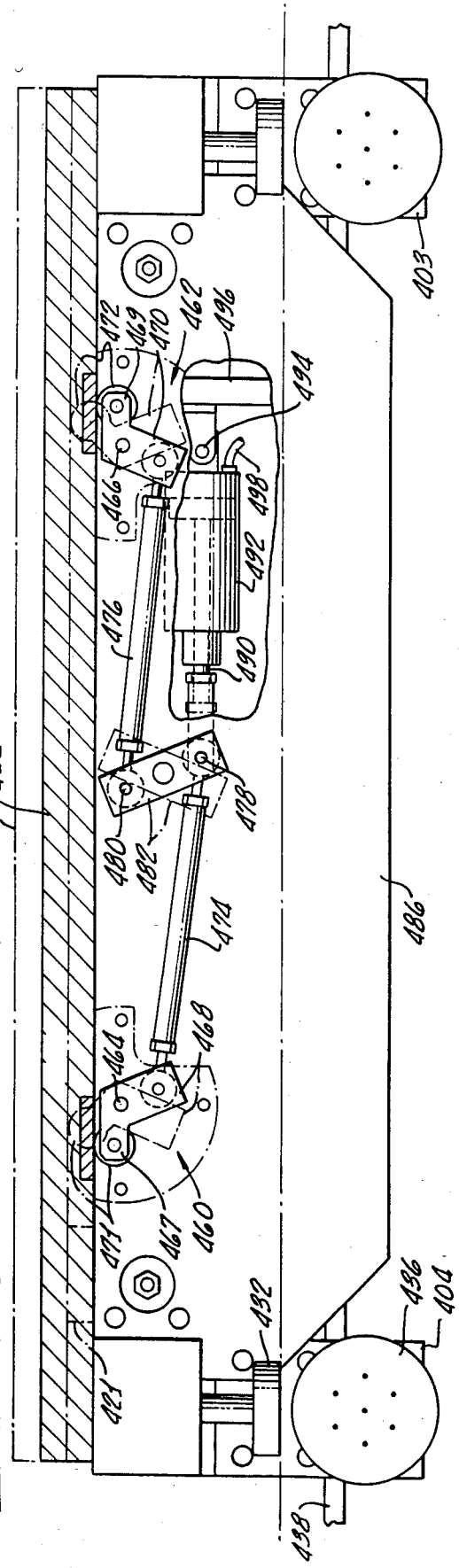

SURFACE DEVIATION COMPENSATION FOR A BEAM SCANNING SYSTEM

BACKGROUND OF THE INVENTION

In a typical laser flying spot scanner system for either reading or writing, a laser beam is reflected from a rotating mirror to be angularly displaced and sweep in a linear scan path across the surface of a medium. The medium is moved transversely to the scan path so as to produce a number of beam sweeps across the medium, successively displaced along the medium. Because the beam in the plane of the sweep is inclined to the medium surface, with increasing inclination at the outer limits of the beam sweep, the points of impingement of the beam upon the surface depend upon the relative position of the surface with respect to the origin of the beam scan. If the medium surface moves toward or away from the optical scanning system, the points of impingement of the beam move along the scan line according to the magnitude of surface displacement and the angle of the beam. In a writing system the medium is frequently a photosensitive surface fixed to a substrate, which in turn is pinned to a platen fixed to the moving table of the system. Thickness variation of the substrate, which variation may be up to 30 mils, will cause a displacement of the medium surface from a nominal plane that may be large enough to introduce unacceptable errors of size or position of the image formed by the scanning beam.

In some scanning systems, a nominal plane for the position of the surface of the scanned medium is established at three nominal points, and the platen carrying the medium and its substrate is raised until three points of the medium surface are positioned at the nominal points. During the writing or imaging process, the platen is then moved precisely parallel to the nominal plane and transversely of the scan path. If the medium surface is perfectly flat and parallel to the nominal plane, there is little problem. However, if the surface of the medium is not planar, or if the substrate upon which the photosensitive medium is carried should vary in thickness, either along a scan line or in the direction of motion of the medium across the scan line, various points of impingement of the scanning beam upon the medium surface will be displaced from the nominal plane and, therefore, will be displaced along the scan line. At areas where the substrate is thicker, so that the medium surface is closer to the origin of the scan, the point of beam impingement is moved closer to the midpoint of the scan, whereas at areas where the medium substrate has a less than nominal thickness, the point of impingement of the beam is displaced further outwardly along the scan line. Thus, the image position and size will vary for substrates that are warped or of varying thickness.

Accordingly, it is an object of the present invention to enable scanning that will eliminate or significantly decrease above-mentioned problems.

SUMMARY OF THE INVENTION

The beam of a flying spot scanner, which is arranged to impinge upon a medium surface at points of the surface lying in a predetermined nominal plane, is subject to error caused by deviation of the medium surface from the nominal plane. In carrying out principle of the present invention in accordance with a preferred embodiment thereof, the error is decreased by sensing deviation of the medium from the nominal plane at each one of a group of scan lines and shifting the impingement points along each scan line by an amount related to the medium surface displacement for respective ones of the scan lines of the group. In such a scanner, a reference member is frequently employed to define positions of the scanning beam in the course of each scan line. The deviation of the medium surface from a nominal plane may be sensed by detecting the distance between the reference mask and the medium surface. Such sensing and deviation correction may be most conveniently carried out by maintaining a fixed distance between the reference mask and the medium surface. In a system where the platen that carries the medium and its substrate moves in a plane fixed relative to a support table, the error is diminished by allowing the reference mask to float above the medium surface so as to remain at a fixed distance from the surface as the surface height varies due to thickness variation.

Alternatively, the reference mask may be fixed, and the platen carrying the medium and its substrate may be mounted to float above the table. The platen is continuously urged toward the reference mask, or a structure fixed relative to the mask, so as to maintain a fixed distance between the mask and the surface of the medium.

BRIEF DESCRIPTION OF THE DRAWINGS

FIG. 15 is a top plan view of one side of the carriage of FIG. 14;

FIG. 16 is a side elevational view of one side of the carriage of FIG. 14;

DETAILED DESCRIPTION

Figure 1:
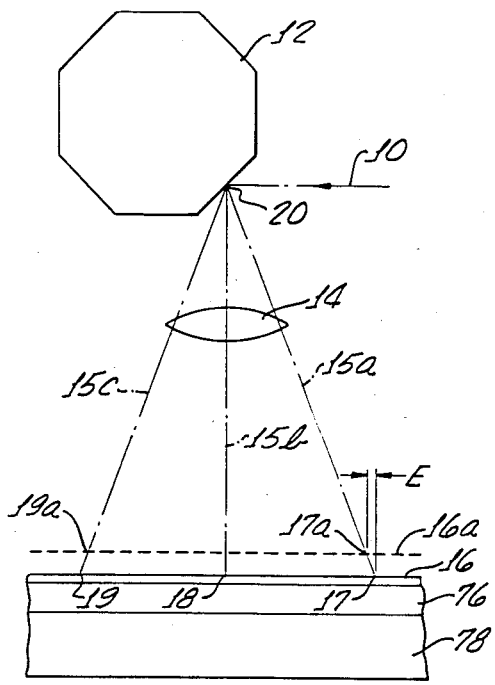
FIG. 1 llustrates geometry of a linearly scanning write beam.

Principles of the present invention are applicable to both reading and writing systems employing a flying spot scanner. For purposes of exposition, a writing system will be described. As schematically illustrated in FIG. 1, an energy beam, such as the beam 10 of a laser (not shown in FIG. 1), is projected to a scanner, such as a conventional rotating polygonal mirror 12, and focused by a lens 14 upon a surface of medium 16. The beam scans the surface through a number of beam positions, of which three are illustrated at 15a, 15b and 15c, and each of which impinges upon the surface 16 at a predetermined point, such as indicated at 17, 18 and 19.

It will be seen that if the medium surface 16 is moved, relative to the origin 20 of the scan, to a closer position, such as indicated by the dotted line 16a, points of beam impingement 17 and 19 are laterally shifted along the length of the line. The new impingement points 17a, 19a on a surface at 16a are positioned closer to the center of the scan line, and thus the image size has been decreased by the amount 2E, where E is the amount of shift of an end point. In most cases the depth of focus of the lens is sufficient to maintain focus of the beam on the displaced surface. A more detailed discussion of this error will be set forth below in connection with FIG. 4. However, certain aspects of an exemplary laser scanning system will first be described as a background for understanding a first embodiment of the invention.

Figure 2:
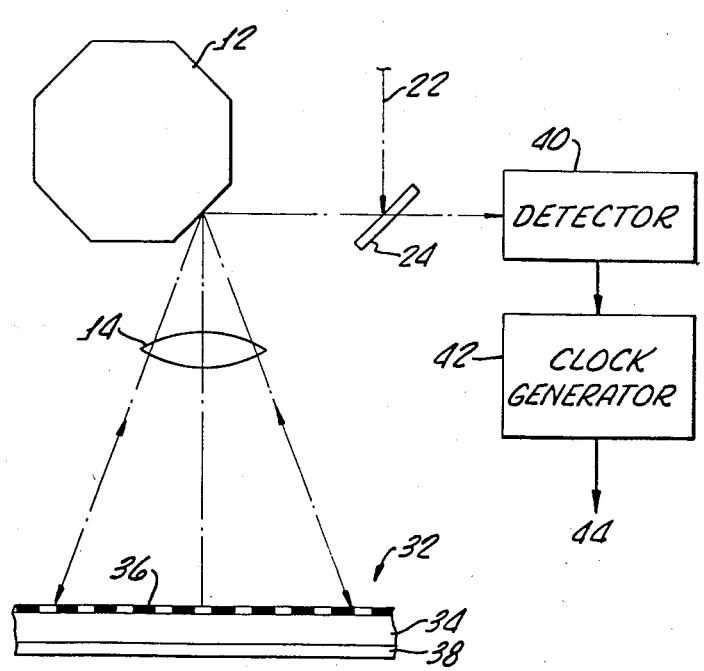
FIG. 2 illustrates geometry of reference system for the write beam of FIG. 1.

The medium 16 is caused to move transversely of the scan path to provide a number of successive mutually displaced paths. In a writing system the energy beam is modulated, generally being turned on or off in accordance with data to be written, and thus writes a desired data pattern by means of a succession of spots or dots. In order to know precisely when to turn the energy beam on and off in the course of each scan line, it is necessary to know the location of the beam along the scan line. However, the scan velocity is non-linear in many systems so that the location of the point of impingement of the beam upon the write medium is neither a fixed, nor readily compensable, function of time. To account for such non-linearities of scan velocity, some systems employ a reference beam to scan a periodic mask in synchronism with the scan of the write beam across the medium. Thus, as illustrated in FIG. 2, a separate reference beam 22 is deflected from a beam splitter mirror 24 to the rotating polygonal mirror 12 and focused through the lens 14 upon a code mask assembly 32, which is formed of an elongated transparent substrate 34 having a code mask of alternate opaque and transparent areas 36 on its one surface, and a retroreflective material 38 on its opposite surface. Further details of such a reference mask system and its use in scanning are described in a co-pending application of Don B. Neumann, Ser. No. 409,906, filed Aug. 20, 1982, now U.S. Pat. No. 4,523,093 entitled Scanning Beam Reference and Read System, now U.S. Pat. No. 4,523,093. The disclosure of such copending application is incorporated herein by this reference as though fully set forth. Reference beam 22, which scans in synchronism with the writing beam 10, is retroreflected from the reference mask material 38, back through substrate 34 and code mask 32, and back through lens 14 and rotating mirror 12. The retroreflected and modulated reference beam is transmitted through the beam splitter mirror 24 to a detector 40. The output of the detector is fed to a clock generator 42 that provides a clock signal 44 which generates the desired reference clock signals that turn the modulator of write beam 10 on and off, in effect defining the location of the point of impingement of the write beam upon the surface of the medium 16.

Figure 3:
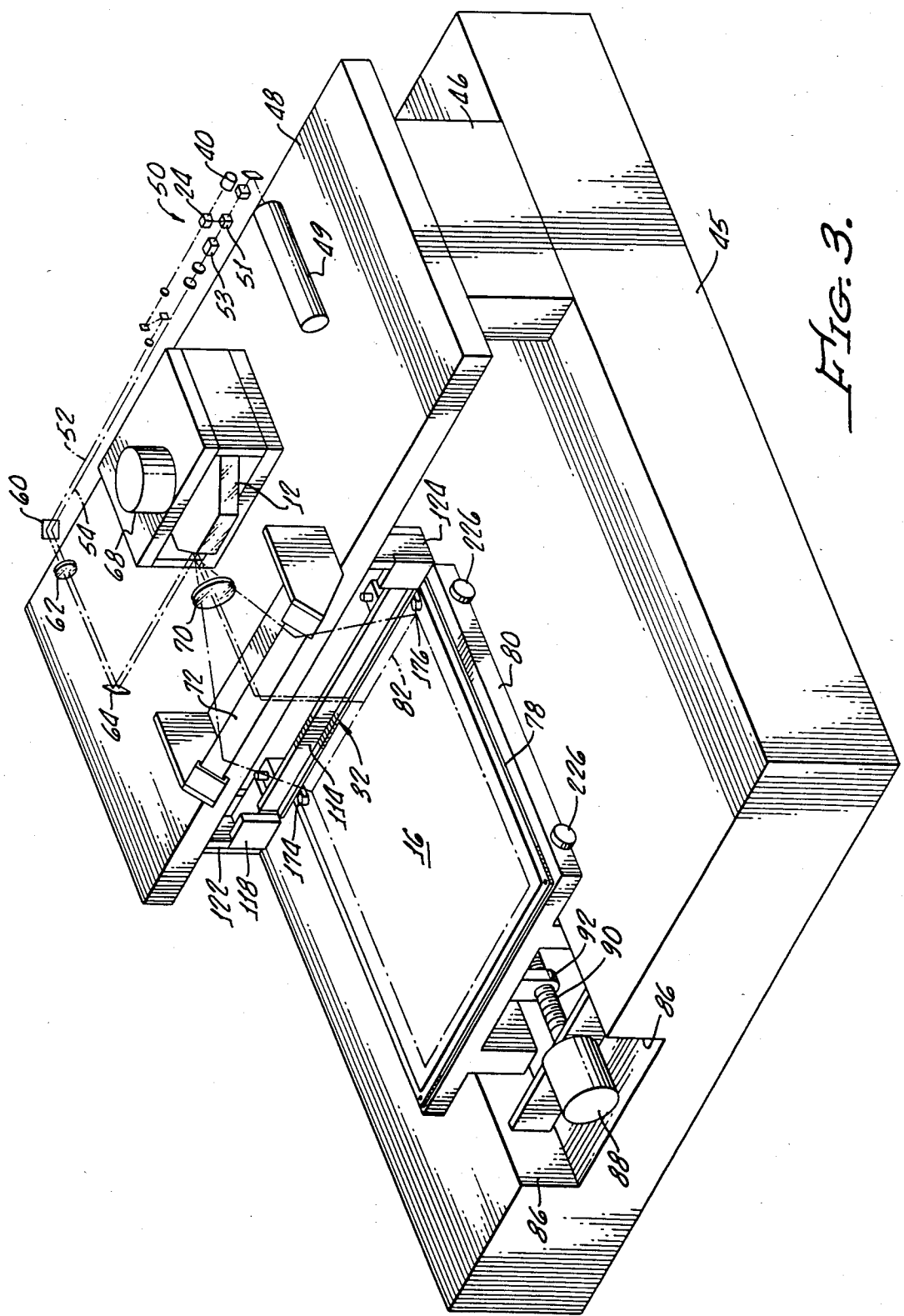
FIG. 3 is a simplified perspective view of a laser scanning system embodying a reference mask employed to define positions of the beam in the course of its scan.
Figure 5:
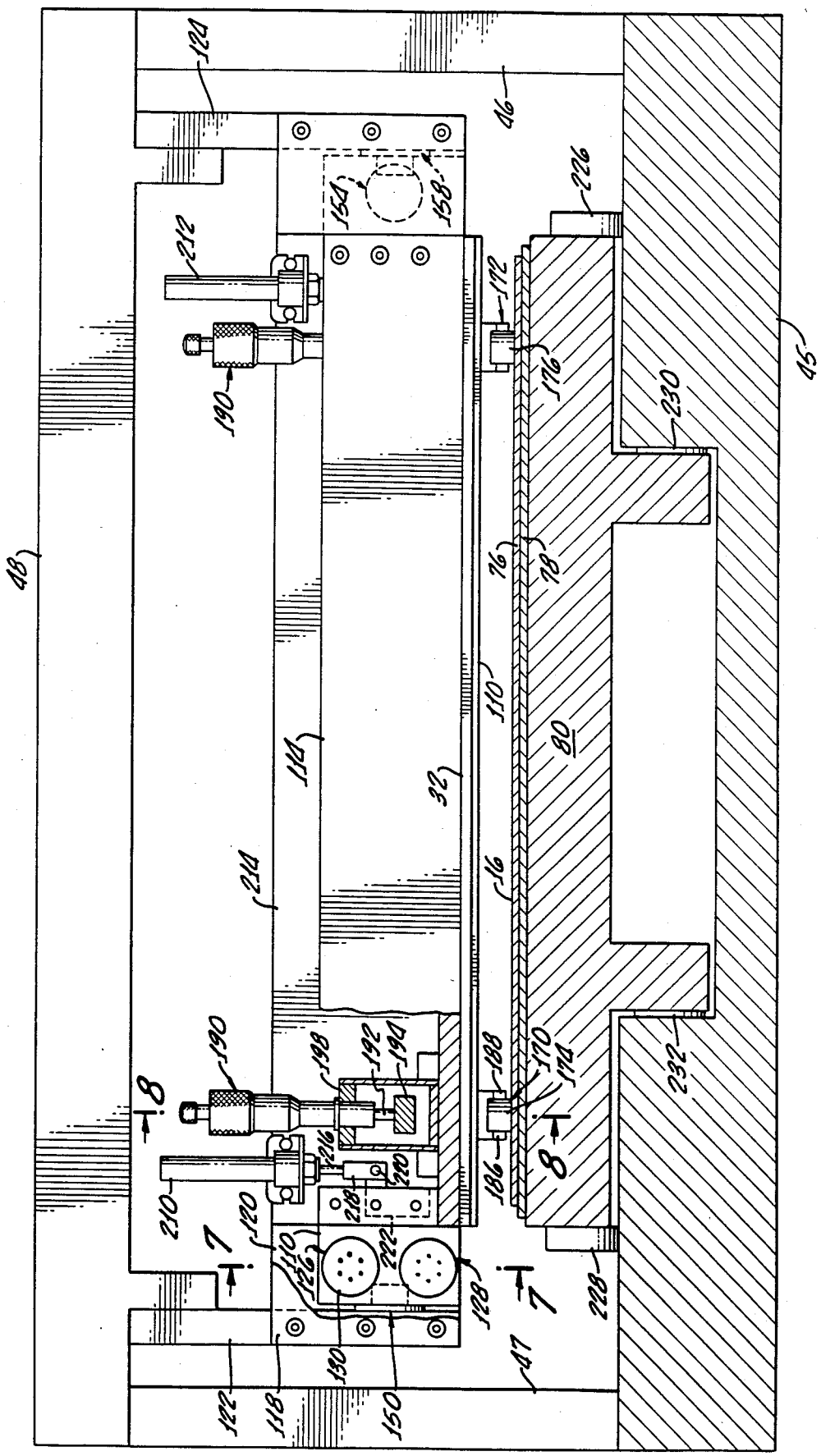
FIG. 5 is a transverse elevation section showing a slidable platen and a floating reference mask assembly.

Illustrated in FIG. 3 are certain structural features of a laser writing system embodying principles of the present invention. A base 45 includes a pair of column structures 46, 47 (FIG. 5) carrying a scanner table 48 on which is mounted a laser 49 and an optical system 50 that generates, by means including a beam splitter 51, both a write beam 52 and a reference beam 54. The two beams are positioned close to one another, but may be mutually spaced in a vertical plane. The two beams from the laser 49 are directed through the optical system 50 to a turning mirror 60, and through a collimating lens 62 to a second turning mirror 64 which directs the beams to the reflecting surfaces of the polygonal mirror 12, which is rotated at a constant speed by a motor 68. The write beam, after passing through a modulator 53, passes through the center of lens 62 without deflection, but the lower reference beam 54 is deflected upwardly as it passes through the lens below the lens center so that the two beams are substantially overlapped at the scanning mirror 12.

Both beams are reflected from each surface of the mirror 12 through a focusing objective lens 70, and complete their horizontal traverse at a horizontally elongated turning mirror 72. The structure described to this point is mounted upon the scanner support table 48.

In the illustrated exemplary embodiment, the reference beam is inclined slightly upwardly to cross the write beam at the scan mirror surface whereby the reference beam will strike a higher portion of the turning mirror 72 and be reflected downwardly to the reference beam code mask assembly, generally indicated at 32. The reference beam passes closer to the edge of the table 48 and is retroreflected from the code mask back to detector 40 of the optical system 50. The write beam, on the other hand, strikes a lower portion of the turning mirror 72 and is reflected vertically downwardly along a path slightly further from the table 48 to impinge upon the write medium, which may be a suitable light sensitive emulsion 16 carried upon a substrate 76 (FIG. 1), which, in turn, is mounted upon a platen 78 which is carried by a moving carriage 80. Position of the substrate 76 upon platen 78 may be fixed by registration pins (not shown) fixed to the platen and extending through holes in the substrate. Rotation of the scanning mirror 12 causes the reference beam to scan substantially the full length of the code mask assembly 32 and also causes the write beam to traverse its linear scan path 82 across the surface of the write medium 16.

The position of the scan line 82 on write medium 16 is moved for each successive scan by moving the carriage 80 horizontally in a direction perpendicular to the length of the scan line 82. To this end, the carriage is guided along rails 86 mounted in the base support 45. A motor 88 drives a lead screw 90 engaged with a nut 92 carried by the carriage to move the carriage for successive scans. It will be readily appreciated that the described system is merely exemplary of many different systems that may be employed, having different write medium support and drive systems, different optical systems, different types of scanning mirrors, and different methods of reference beam generation.

Referring back to FIG. 1, the surface of the scan medium 16 may deviate from its nominal plane and be displaced either toward or away from the beam source, which may be considered as the reflecting surface of polygonal scanning mirror 12. For example, should the substrate 76 have a thickness greater than a nominal predetermined thickness, the surface of the medium 16 may be positioned in a plane indicated in dotted lines at 16a. With a medium surface positioned at 16a instead of at 16, the point of impingement 17 of beam 15a will be at point 17a. Similarly, the point of impingement of the beam 15c on the surface 16 will now be at point 19a. The image size between points 17a and 19a is smaller than the size between points 17 and 19 and, thus, both the position of the impingement points and the image size have been changed by the deviation of the medium surface from its nominal plane.

There are several possible solutions to this problem. The platen, together with the substrate and photosensitive film, may be moved so as to avoid or minimize the deviation of the film surface from the nominal plane, but such motion must be accomplished repetitively during the traverse of the carriage 45, because the medium surface deviation may vary from scan line to scan line. To compensate for variations of the film surface deviation from scan line to scan line and from one end of a scan line to another, the deviation of the film surface from the nominal plane may be sensed at each individual scan line, or closely adjacent to such scan line. The deviation then can be corrected by moving the platen, together with its substrate 76 and film surface 16, up or down as required to minimize the deviation. Such an arrangement requires mounting the entire platen for repetitive or continuous vertical motion during the course of each imaging operation. A mechanization of such an arrangement is described below, and is illustrated in FIGS. 13 through 18. Alternatively, the smaller code mask assembly can be moved up or down so as to decrease the error due to deviation of the film surface from a nominal plane. The latter arrangement is advantageous, at least in part, because it is simpler to mechanize in a precision system.

The exact time that the laser beam is turned on by the modulator to write at a specific image point is determined by the reference system. Accordingly, the timing of the reference clock signals controls the positions of individual spots or dots of data to be written by the scanning beam. Shifting the code mask assembly, as described below, will change the timing of the reference signals and thus will change position of data spots. The reference code mask of prior systems is fixed to the system support and therefore provides a fixed position (for any given instantaneous angle of the beam) at which each image point is written along a scan line on a nominal plane. According to one form of the present invention, the reference mask is caused to move relative to the system such that there is maintained a constant distance from the reference mask to the surface of the medium being scanned. It can be shown that for small changes in substrate thickness (e.g. small deviations of the medium surface from a nominal plane) the maintaining of a constant distance between reference mask and the medium surface will yield a substantially constant sized image.

Figure 4:
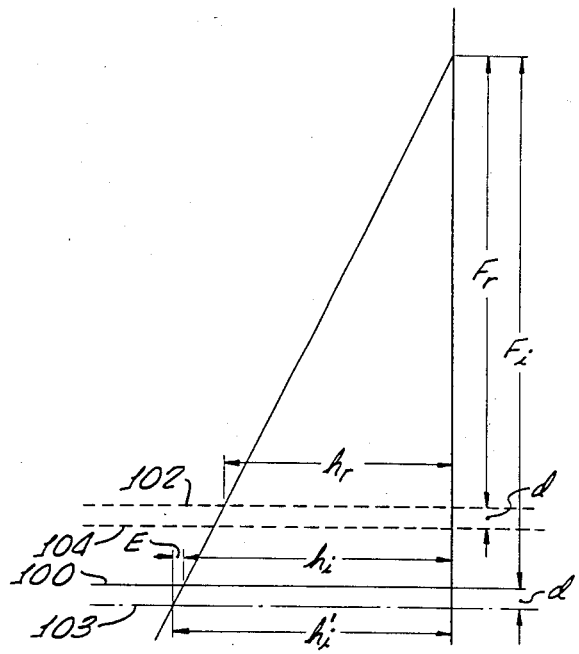
FIG. 4 depicts geometry of surface deviation error.

With reference to the geometry illustrated in FIG. 4, it will be assumed that the system has a write medium located in a nominal plane 100 and has a reference mask positioned at a nominal surface 102. The nominal mask position is chosen to provide a proper sized image when the optical distances of the reference mask and material surface from the scanning beam source are $F_r$ and $F_i$, respectively. Should a variation in thickness of the medium bearing substrate occur such that, for example, the photosensitive surface drops by a distance d from the nominal surface to a plane 103, and assuming that the reference mask will move with the deviation of the medium surface so as to drop through the same distance d to a new position 104, a new image size (actually half image size) $h'_i$ can be calculated from the original image size $h_i$. Original (or nominal) image size $h_i$ may be taken as a function of the distance between the center line of the scan and the point of impingement of the beam at the end of a scan line upon the surface in its nominal plane 100. Similarly, reference point size, which is the distance between the point of impingement of the reference beam upon the nominal reference plane 102 and the beam scanning center line, is designated $h_r$ in the drawing of FIG. 4. In the nominal positions, $$h_i = \frac{F_i h_r}{F_r} \qquad \text{Eq. (1)}$$

At the dropped position, with the imaging surface at plane 103 and the reference at 104, $$h'_i = \frac{(F_i + d)h_r}{F_r + d} \qquad \text{Eq. (2)}$$

Accordingly, $$h'_i = h_i \left[ 1 + \frac{d(F_r - F_i)}{F_i(F_r + d)} \right] \qquad \text{Eq. (3)}$$

In a typical example, employing an image that is 18 inches wide, $F_r$ is equal to 19 inches, $F_i$ is equal to 20 inches, and $h_i$ is equal to 9 inches. Then the ratio of the error E to the displacement from the nominal plane is $$\frac{h'_i - h_i}{d} = \frac{(F_r - F_i)h_i}{F_i(F_r + d)} \approx \frac{(F_r - F_i)h_i}{F_i F_r} = \frac{9}{380} \qquad \text{Eq. (4)}$$

where d is very small.

Therefore, for a thickness deviation d of 10 mils and $h_i = 9$ inches, the image shift is 0.24 mils if the reference code mask is also displaced by d. If the reference mask had been fixed, the image size error for 10 mil thickness deviation is $h'_i - h_i$, which is 4.5 mils with the exemplary dimensions given. Accordingly, in this example, the sensitivity factor, that is, the magnitude of the image size error per mil of thickness deviation, is descreased from 0.45 to 0.024 which is an improvement of nearly twenty times.

This significant decrease in the error is achieved by moving the reference mask so as to maintain a fixed difference between the optical lengths $F_r$ and $F_i$. In an exemplary embodiment this is done by maintaining a constant spacing of the reference mask from the write medium surface on or adjacent each scan line. As previously mentioned, the depth of field of the optical system is sufficiently great to accommodate the relativey small variations in position of the medium surface.

To mechanize the concept described in connection with FIG. 4, the reference code mask assembly is mounted for freedom of motion in a vertical direction (toward and away from the medium surface in the illustrative scanning system), but restrained against all other motions. The position of the reference mask is caused to track the position of the medium surface (so as to maintain a fixed distance between them) by causing the reference mask to rest on air bearings supported upon the surface of the medium so that the reference assembly will move upwardly and downwardly as portions of the medium surface and substrate of varying thickness pass beneath the reference mask. Other air bearings support and constrain the reference mask assembly against all motions other than the free vertical motion. The reference mask assembly is spring urged against air bearings at one end so as to assure negligible motion along its length as it moves up and down.

Referring now to FIGS. 5-9, the reference mask assembly 32, which includes the transparent substrate 34 having the mask pattern 36 of alternate opaque and transparent areas on one surface and the retroreflective material 38 on the other surface, is pressed by means of a clamp member 110 against the lower leg 112 of a rigid structural angle member 114 that extends substantially from end to end of the reference mask assembly. The angle member 114 at both ends is fixedly secured to end blocks 116 which are slidably constrained in front and back end walls 118, 120 that are bolted to vertically extending hanger bars 122, 124, which suspend the reference mask assembly from the fixed support table 48.

The end blocks 116 are slidably mounted relative to the fixed end walls 118, 120 and relative to the end hanger bars 122, 124 by means for air bearings mounted in cavities in the end blocks. These bearings may be of the type described in detail in the U.S. patent of Richard P. Eddy, for Air Bearing Guide System, U.S. Pat. No. 4,378,134. End block 116 slides along the inner surface of front end wall 118 by means of first and second fixed air bearings on 126, 128, each of which includes a perforated bearing disc 130 in contact with the wall 118 and carried by a cylindrical sleeve 132 which is sealed at its inner end by a spherical cap 134. Each cap has an aperture that allows air under pressure from a hose 136 to fed via passages in the end block 116 to the bearing, and thence through the apertures (see FIG. 5) on the outer surface of bearing disc 130. Fixed bearing 128 is identical to the fixed bearing 126.

The other side of the end blocks are held in substantially frictionless sliding contact with the rear end wall 120 by means of a pair of movable or "spring-loaded" bearings 140, 142. Each of these bearings includes an apertured bearing plate 144 mounted on an open ended cylindrical sleeve 146 which is spaced from the innermost end 148 of the cavity end block in which the bearing is mounted. The diameter of sleeve 146 is greater than the diameter of sleeve 132. Each of the bearing sleeves is mounted in a comparable cavity formed in the end block. The space within the cavity and within the open-ended sleeve 146 receives pressurized air from the conduit so that the pressure of air confined between the bearing sleeve 146 and the end block cavity urges the bearing disc 144 outwardly (to the left, as viewed in FIG. 7) and allows the bearing to closely follow small changes in the distance between the end block 116 and wall 120. In effect, the movable bearings 140 and 142 act like air springs that press the end block 116 to the wall 188 (to the right, as viewed in FIG. 7). The block is thus closely held in a position fixed with respect to the end wall 118 as the spherical end caps 134 of the fixed bearings bear against the inner ends of the block cavities. The air bearing discs 130 are separated from the inner surface of end wall 118 by a thin layer of pressurized air that continually flows from the conduit 136 through the bearings and out through the apertures of the bearing discs.

Figure 6:
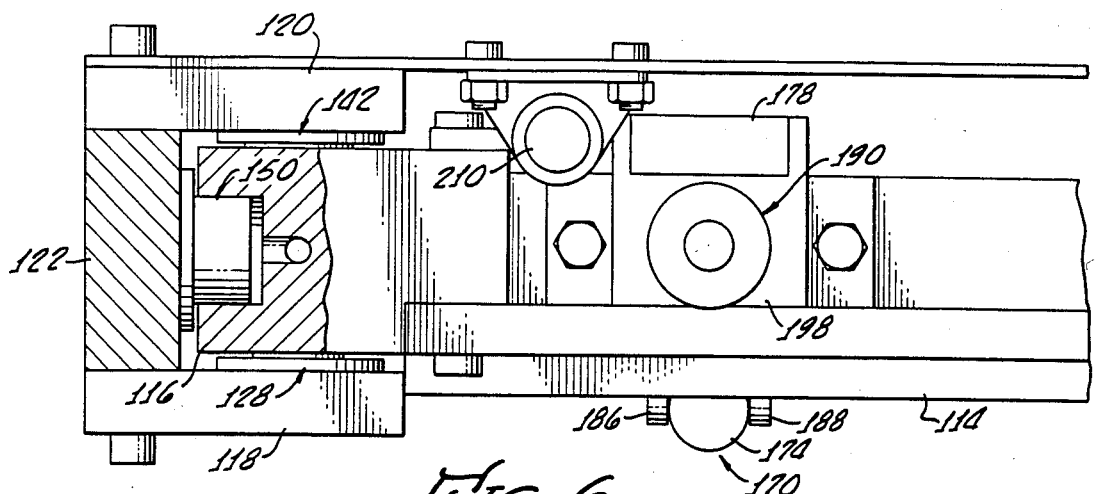
FIG. 6 is a top plan view of a portion of the structure of FIG. 5.
Figure 7:
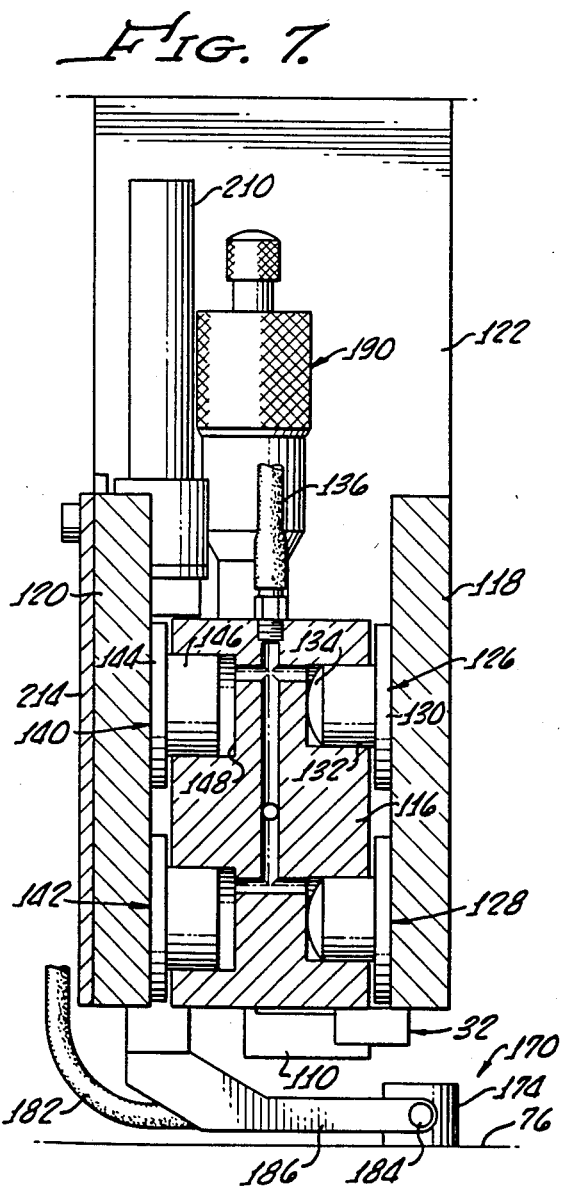
FIGS. 7 and 8 are sections taken on lines 7—7 and 8—8 of FIG. 5.

Adjacent end hanger bar 122, bearing block 116 has an adjustable or "spring-loaded" end bearing 150 arranged to continuously urge the movable hander assembly to the opposite end (toward the right, as viewed in FIG. 6).

The other end of the reference mask assembly includes a single fixed air bearing 154, identical to air bearings 126 and 128, mounted between the end block and end wall at this end of the assembly, and a single adjustable or "spring-loaded" air bearing (not shown) between the back end wall and end block at this end of the reference mask assembly. The longitudinal force of the adjustable air bearing 150 at the left end of the reference mask assembly is countered by force exerted on a fixed air bearing 158 captured in the end block and bearing against the hanger 124 at the other end of the reference mask assembly.

Accordingly, it will be seen that the reference mask assembly is mounted for substantially friction-free motion vertically toward or away from the medium surface, but is very closely and precisely constrained against motion in any other direction. The vertical motion and the adjustability of the "spring-loaded" bearing 150 allows a tilting motion which enables the reference mask assembly to accommodate wedge-shaped substrates. A wedge-shaped substrate, for example, may have a first thickness at an edge adjacent one end of the reference mask assembly and a different thickness at an edge adjacent the other end of the reference mask assembly. With such a substrate, the reference mask assembly will tilt about an axis perpendicular to its length and substantially parallel to the medium surface, whereby the distance between the reference mask and the medium surface at each end of the reference mask assembly will remain substantially constant.

Distance between the medium surface and the reference code mask assembly is sensed, and the position of the reference mask assembly is controlled by a pair of pressure feet 170, 172. The pressure feet are fixedly, but adjustably secured to the respective end blocks 116 and include air bearings 174, 176 that slidably rest upon the upper surface of the write medium at opposite ends of, and beyond the outermost limits of, the laser beam scan line. The two pressure feet slidably support the reference code mask assembly upon the medium surface, and each comprises a generally L-shaped leg 178 having a bifurcated horizontal arm or yoke 186, 188 straddling an air conduit 182 which feeds air to the air bearing 174. The air bearing 174 is pivotally mounted upon a horizontally positioned pivot pin 184 carried by the yoke 186, 188.

Adjustment of the fixed but predetermined distance between the reference mask and the medium surface is achieved by a micrometer adjustment mechanism 190 (FIG. 8) at either end of the reference mask assembly. Each micrometer has its body fixed to the main structural angle 114 and includes a movable adjustment rod 192 (FIG. 5) that bears upon a projecting tongue 194 fixed to the pressure foot 178. Each pressure foot is securely mounted to brackets 198, 200 by means of adjustment screws 202, 204 threaded in the brackets and extending through enlarged apertures 206, 208 in the pressure foot 178. The brackets 198, 200 are fixed to structural angle 114. When the bolts 202, 204 are loosened, the position of the pressure foot and its bearing 174 can be adjusted upwardly or downwardly relative to the reference code mask assembly 32 by the micrometer 190, whereupon the pressure foot and its bearing may then be locked in position relative to the reference mask by tightening the bolts 202, 204. This relative adjustment of the pressure foot and reference mask sets a predetermined nominal distance between the mask and the scan medium surface. This adjustment determines the position of the nominal plane of the write medium and is not changed during the writing process.

As the platen, the substrate and medium surface are driven across the scan line, the reference mask supporting pressure feet 170, 172 in effect sense the distance between the reference code mask assembly and the medium surface. This sensing is accomplished at each end of the reference mask, and on or close to the line on the medium surface where the beam traces its scan path. The sensed distances are automatically adjusted for each scan because the fixed relation between the pressure feet and reference code mask assembly causes the latter to move up and down as the medium surface moves up and down in the course of its traverse beneath the reference code mask assembly.

It may be noted that thickness variation is reasonably linear along any given scan line so that sensing of surface elevation only at ends of each scan line provides a major improvement.

To start an imaging operation, the medium surface initially must be placed beneath the reference mask and under its supporting pressure feet. For this purpose, a mechanism is provided to initially raise the entire reference mask assembly to allow the medium and its supporting substrate to be positioned underneath the pressure feet. Pneumatic cylinders 210, 212 are mounted to a fixed transversely extending plate 214 that is fixed at its opposite ends to the hanger bars 122, 124, respectively. Cylinder 210 has a piston rod 216 (FIG. 9) that is fixedly joined to a yoke 218, which, in turn, is pivoted on a trunion 220 to an L-shaped bracket 222 that is fixedly mounted to the end block 116. The pneumatic cylinders 210, 212 are pressurized to raise the entire reference mask assembly prior to the start of an imaging operation and allow initial positioning of the table and scan medium below the pressure feet. Upon depressurization of the cylinders 210, 212, the reference code mask assembly descends, under the force of gravity, until the air bearings 174, 176 contact the medium surface. Air pressure supplied to these air bearings then provides a firm friction-free slidable contact between the air bearings and the medium surface, while the now depressurized cylinders 210, 212 exert effectively no restraint upon the vertical motion of the reference mask assembly. Cylinders 210, 212 remain depressurized during the remainder of the operation and are again actuated to raise the pressure feet upon completion of the imaging.

Suitable friction-free, or other low friction supports and guides, are provided to support the carriage 80 as it slides along the fixed base 45. Such supports preferably are of the type described in the above mentioned U.S. Pat. No. 4,378,134 and may include pairs of wheels 226, 228 (FIG. 5) at each side of the carriage to support the carriage and pairs of fixed and movable air bearings 230, 232 of the type previously described, there being at least two such bearings on either side of the carriage to provide precisely constrained slidable motion.

Figure 8:
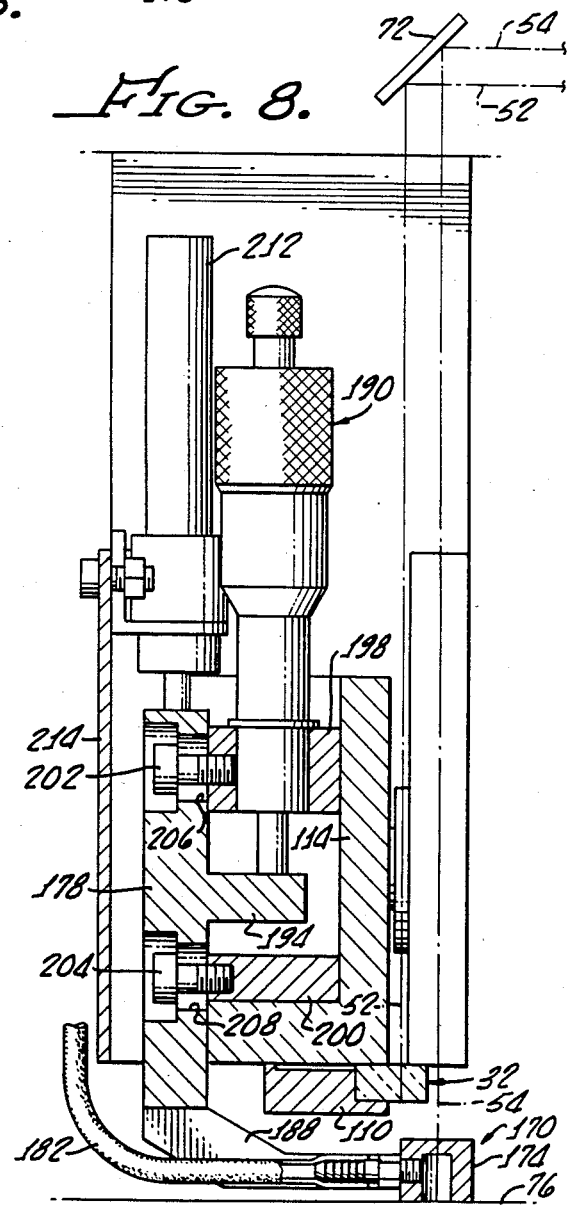
Figure 9:
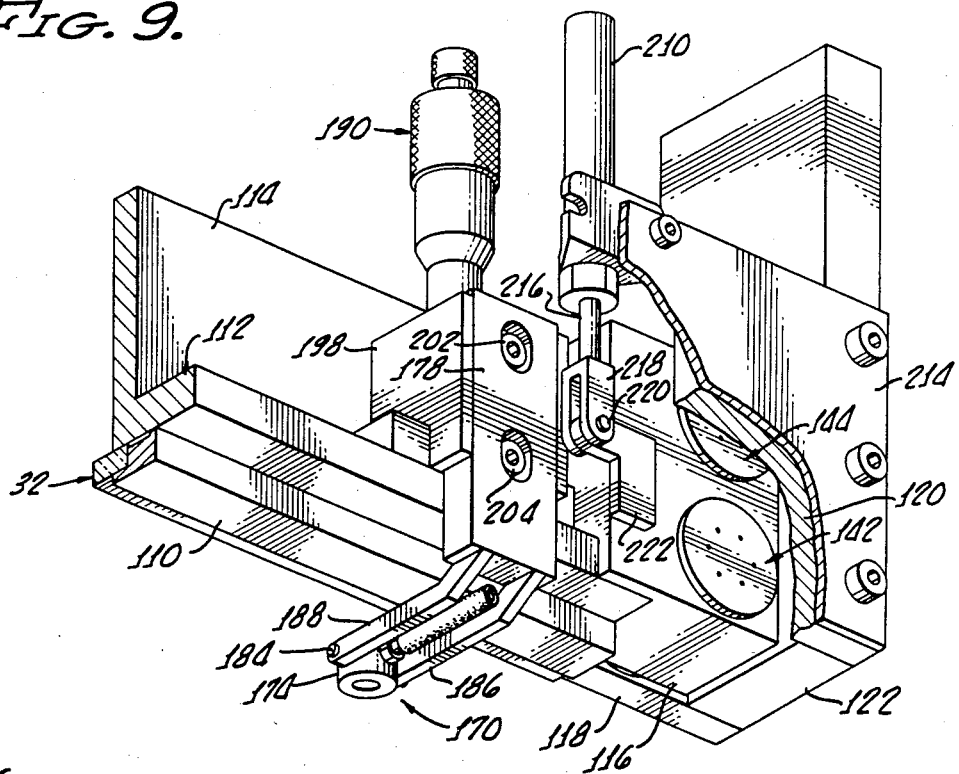
FIG. 9 is a fragmentary pictorial view, with parts broken away, of one end of the reference assembly structure.

FIG. 8 schematically ilustrates the paths of the writing and reference beams, both reflected from the turning mirror 72, with the reference beam 52 passing through the mask substrate 34 (FIG. 2) at a very slight angle to the plane of the mask surface and reflected by the retroreflector material 38, back to the mirror, and thence to the detector 40. Write beam 54 is also reflected by the turning mirror 72 downwardly onto the surface of the medium to scan along a path between the air bearings 174, 176. In this arrangement, the air bearings, and thus the positions for sensing height of the medium surface relative to the reference mask, are precisely on each writing beam scan line. This requires that the length of the scan line be less than the distance between the pressure feet and their supporting air bearings. If deemed necessary or desirable, the air bearings and pressure feet ends can be moved rearwardly (toward the left, as viewed in FIGS. 7 and 8) to be displaced slightly from the scan path of the write beam, so that the latter can scan for a length equal to or greater than the distance between the pressure feet and reference mask supporting air bearings. In either case, the distance between the reference mask and medium surface is sensed at, or nearly at, each scan line, and any variations in such distance are automatically modified so as to minimize deviations.

It will be noted that from one point of view, the scanning system described above creates a modulated scan line (of the write beam) of precisely correct length and focus somewhere in space near the supporting platen. Ideally, the photosensitive material surface should be placed through such scan line position and should remain there despite any variation of the material substrate thickness. This would yield an accurately positioned and sharply focused image. In effect, the controlled continuous adjustment of the code mask assembly causes the modulated scan line of precise length to move so as to tend to remain at the ideal location on the photosensitive medium surface.

Optimumly, if the reference mask and medium surface remain in the same plane (are coplanar), the error is zero. This is the same as maintaining the optical path lengths of the two beams equal to each other. As can be seen from Equation (4), if $F_r = F_i$, the error $h'_1 - h_i$ is zero. It is more convenient to mount the reference mask at a distance from the medium surface, as in FIGS. 4–9, and thus, ideally, the ratio of the two optical path lengths must remain constant to minimize the error. However, if the difference in path lengths is small, compared to the path length, maintaining such difference constant is equivalent to (and much simpler than) maintaining a fixed ratio of optical path lengths. Accordingly, it is only necessary to sense deviation of the medium from the nominal plane, at each scan line, and vary the optical path length of the reference beam, physically or optically, so as to decrease the change in the difference between the two optical path lengths. Moving the reference mask is the presently preferred way of varying the optical path length of the reference beam for applications in which differences in the thicknesses of different substrates are relatively small. Where substrates may vary in thickness, from one substrate to another, by as much as ½ inch, the floating platen arrangement of FIGS. 13–18 is preferred.

The compensation system, illustrated in FIGS. 5–9, can handle errors caused by deviation of the medium surface from the nominal line, provided such deviations are small. However, the correction for size error, due to thickness variation of the substrate, is not limited to such small deviations where the distance between medium surface and reference mask is held constant by fixing the reference mask and moving the medium surface. Such a correction can be accomplished by placing position sensors at each end of the scan line to detect the deviation of the medium surface from a nominal line. Information provided by the position sensors may be used to control the height of the platen carrying the medium and the substrate, to vary this height so as to maintain the medium surface always at its nominal position at each scan line. This arrangement of moving the platen, rather than the reference mask, is not limited by the depth of field and will assure that the material surface is in optimum focal position.

Figure 10:
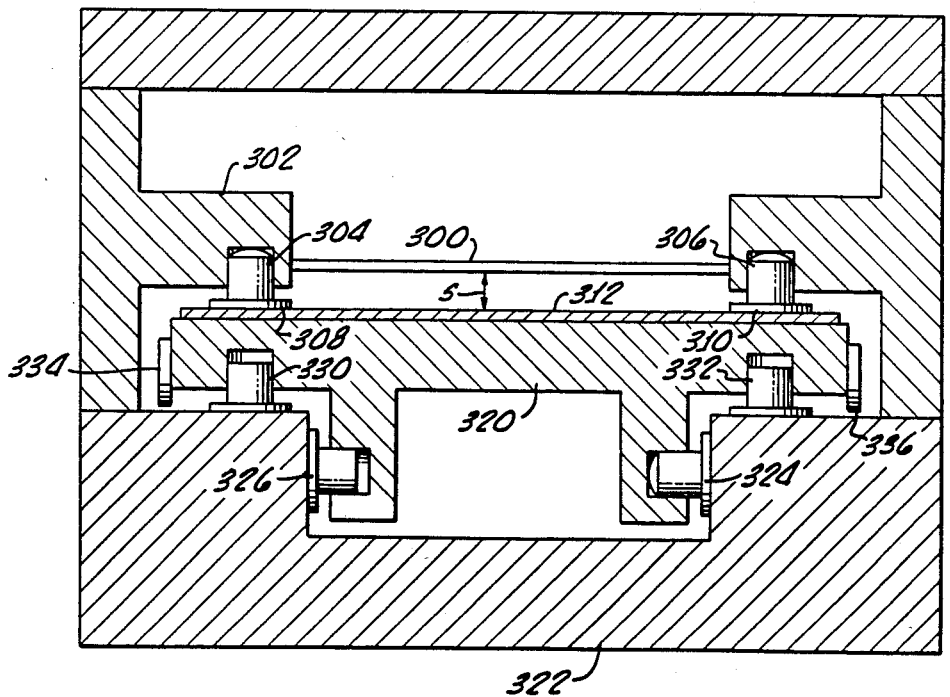
FIG. 10 illustrates a modified form of apparatus embodying principles of the present invention.

A simplified system with automatically adjustable platen height is illustrated in FIG. 10. In this schematic illustration, a reference code mask assembly 300, substantially identical to the reference code mask assembly described above, is fixedly mounted to a supporting structure 302 and carries a pair of fixed air bearings 304, 306 of the type previously described. The air bearings have bearing discs 308, 310 resting upon the surface of a photosensitive material 312, carried on a substrate and platen by means of a movable carriage 320. The carriage is guided along a fixed support 322 by means of pairs of fixed air bearings 324 on one side and movable or adjustable "spring-loaded" air bearings 326 on the other side.

The carriage 320, together with the platen, substrate, and photosensitive material supported thereon, are urged upwardly to press the upper surface of the photosensitive material against the fixed air bearings 304, 306 by means of two adjustable or "spring-loaded" air bearings 330 on one side and two similar bearings 332 on the other side, between the support 322 and the carriage 320. Therefore, as the carriage and the write medium 312 are moved along the base support 322 and under the laser scanning beam (not shown in FIG. 10), the distance between the reference code mask assembly 300 and the surface of the medium 312 is automatically sensed and held constant at each of the scan lines. It will be understood, of course, that the sensing and controlling air bearings 304, 306 are positioned on or adjacent to the scan line of the laser in a manner similar to that previously described in connection with the embodiment of FIGS. 5-9.

To start an imaging operation, the air bearings are depressurized to allow the carriage to be lowered on side supporting wheels 334, 336 and then moved to a position beneath the sensing air bearings 304, 306, at which point all air bearings may be pressurized so that the supporting and adjusting bearings 330, 332 will press the carriage and the material supported thereby up against the fixed air bearings 304, 306.

Figure 11:
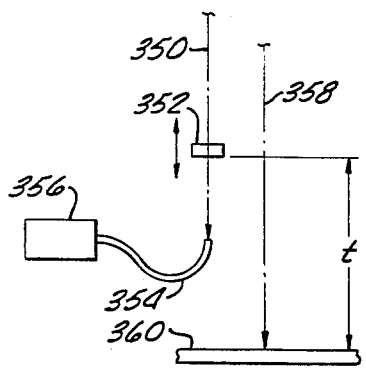
FIGS. 11 and 12 illustrate still further modifications.

Other reference generating systems have been suggested for use in flying spot laser scanners, such as, for example, the system schematically illustrated in FIG. 11. In this arrangement, the reference beam 350 is passed through a transparent reference mask 352 to be collected by a linear array of fiber optics 354 which transmits the optically coded reference signal to a detector 356. The scanning write beam 358 impinges upon a medium 360 that moves across the scan line just as previously described. In such an arragement, the reference mask is mounted for motion toward and away from the medium 360 so that the distance t between the mask and the medium surface may be controlled so as to remain constant, as previously described.

Figure 12:
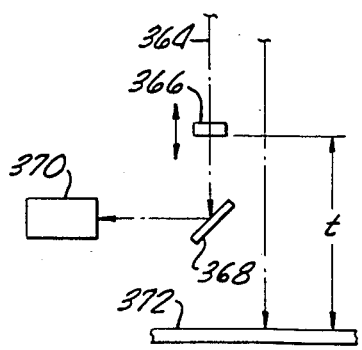

In another movable reference mask arrangement, illustrated in FIG. 12, the reference beam 364 is passed through a code mask 366 to a reflecting mirror 368 for reception by a detector 370. Again, the distance t between the movably mounted reference mask 366 and the surface of a photosensitive medium 372 is held constant by moving the reference mask toward or away from the medium surface in the manner previously described in connection with the embodiment of FIGS. 5-9. Of course, the reference system arrangements of either of FIG. 11 or 12 can also be used with a fixedly mounted reference mask and a vertically movable platen and photosensitive medium in an arrangement such as described in connection with FIG. 10.

Moving the reference mask is a method of mechanically changing the reference signal timing. It is also contemplated to time shift the reference signals electronically in synchronism with the angular beam sweep, so that the code mask assembly may be fixed in a vertical position, while still correcting the error due to substrate thickness deviation.

The floating reference system of FIGS. 3-9 is simple and accurate, but is limited in differences of thicknesses of substrates with which it can be used. It is particularly useful for a scanning system, such as a laser pattern generator, for example, which employs substrate mounted film for the scanned medium and in which the variation of thickness from one such substrate to another may be relatively small (although much greater than the up to 30 mils thickness variation on any individual board). Illustrated in FIGS. 13-18 is a system having a fixed reference assembly and a vertically floating platen. Such a system is preferred where substrates of more widely different thicknesses may be encountered. The floating platen system of FIGS. 13-18 will accommodate substrates of much greater differences in thickness and may be made for use with substrates that may vary in thickness from one substrate to another by as much as ½ inch or more. It is to be noted that this ½ inch range is not the thickness variation of any individual substrate, which may be merely a few mils, as previously mentioned, but the difference in thickness between two substrates to be used successively with the scanning system. In direct imaging systems, where a pattern is produced by a laser beam directly upon a circuit board, many different types of circuit boards are employed and have many different types of substrates of differing thickness. Thus, the floating platen system of FIGS. 13-18 can readily handle a greater variety of applications.

Referring now to FIGS. 13-18, a table 400 having support legs 401, 402, 403, 404 rigidly interconnected by end structures 406, 408, has first and second transversely spaced side housings 410, 412, which define four rectangular vertical guideways 413, 414, 415 and 416 (FIG. 14) which slidably receive corresponding legs 418, 419, 420 and 421 fixed to and depending from a platen 422 to thereby slidably mount the platen to the table 400 for adjustable vertical motion. The platen is closely restrained against any lateral or longitudinal motion by sets of air bearings in each guideway, such as bearings 424, 426 in guideway 414, which closely confine the platen legs in the constraining guideways, but allow a nearly friction-free vertical motion.

The table, or carriage, 400 is movably mounted upon a massive fixed base 428 by means of two support air bearings 430 on one side of the table and two similar support air bearings 432 on the other side of the table, each of which bears upon an upwardly directed horizontal surface of the base 428. The table is precisely constrained against lateral motion in the course of its longitudinal transport along the base by means of side thrust bearings 434, 436 provided in groups of two along each side of the table and bearing outwardly against inwardly-facing vertical sides of the base 428.

The table support and guiding may be of the type described in the above identified U.S. Pat. No. 4,378,134. Longitudinal transport of the table along the base is accomplished by a belt 438 fixed to the underside of the table 408 and engaged with a pair of longitudinally spaced drive pulleys, such as pulley 440. The pulleys are carried on the base and driven by a suitable motor (not shown).

The fixed base 428 includes fixed upstanding side walls 442, 444 on opposite sides of the table, analogous to and positioned similarly with respect to walls 122, 124 of FIG. 3 at either end of the span path of a laser scanning system. The laser scanning system (not shown in FIGS. 13-18) is mounted on the fixed base 428 and is substantially identical in structure, position and function to the system shown in FIG. 3, except that the reference assembly does not float. Fixedly mounted to the side walls 442, 444 and extending across the table adjacent the laser scan path, just as previously described in connection with FIG. 3, is a reference code member 446 that is the same as the reference code member 32 of FIG. 3, but fixedly mounted. The reference code member, of course, may be manually adjusted, as necessary or desirable, to maintain a predetermined distance S between the code member and the upper surface 448 of a medium 450 that is to be scanned by a laser beam carried by the fixed base. However, the code member does not float, but remains at a fixed height relative to the base and table as the table is transported across the laser scan path.

First and second height detector sensor assemblies 452 and 454 (FIG. 13) are fixedly mounted to the side walls 442, 444 closely adjacent the code member and positioned on or immediately adjacent the laser beam scan line. The location of the detectors 452 and 454 with respect to the scanned medium 450 and the table and support structure may be the same as are the locations of the sensing pressure feet 170, 176 of the embodiment illustrated in FIG. 5. However, the detectors 452, 454 do not operate to change the position of the code mask member 446, which remains fixed during any complete pass of the table under the scanning beam. Rather, in an arrangement analogous to the embodiment shown in FIG. 10, detectors 452, 454 sense the vertical position of the upper surface 448 of the scanned medium 450 (which is conventionally pinned to the platen 422) substantially at the scan line. Sensed height of surface 448 is used to control vertical adjustment of the platen in an amount and in a direction that causes the upper surface 448 of the scanned medium, at the laser scan line (substantially between the fixed detectors 452, 454), to remain at a substantially fixed vertical distance from a nominal horizontal plane. Such nominal plane is that containing the scan line of the laser, as traced out along the upper surface 448 of the scanned medium when such surface is at the desired elevation. Thus, the arrangement moves the platen up and down so that the scanned surface 448 remains at a fixed distance from the optical source and thereby maintains the distance S between the reference code member and the scanned surface at a constant value.

Two completely independent closed loop elevation controls are provided for the two sides of the carriage, the elevation control on one side being responsive to the elevation detector 452 on that side, and the elevation control on the other side being independently responsive to detector 454 on such other side.

As the two side elevation adjusting mechanisms are identical, except for being of mutually opposite hand, only one need be described. Each mechanism (FIGS. 14, 16) comprises a pair of longitudinally spaced bell cranks 460, 462 pivoted to the carriage side housing 412 at points 464, 466, respectively, and each having first and second arms 467, 468 and 469, 470. Arms 467 and 469 each carry a platen supporting roller 471, 472, respectively, that bear on the undersurface of platen 422 at longitudinally spaced points along one side thereof. The other bell crank arms 468 and 470 are pivotally connected to one end of respective thrust links 474, 476 which have their other ends respectively connected at points 478, 480 to opposite ends of a drive link 482 that is fixed to a shaft 484 journalled in the table side housing 412 at a point midway between the two bell cranks. Shaft 484 is rotatably mounted in the table side housing 412 between its sidewalls 486, 487 (FIG. 15) and carries a fixed arm 488 pivoted to the piston shaft 490 of an air motor 492 that is pivoted at 494 to a cross member 496 of the carriage side housing. Increase of air pressure, applied via a fitting 498 of the air motor 492, drives the air motor piston 500 toward the left, as viewed in FIG. 16, to rotate drive link 482 in a clockwise direction, rotating bell crank 460 in a clockwise direction, and rotating bell crank 462 in a counterclockwise direction, thereby raising both front and back ends of this one side of the platen.

Figure 13:
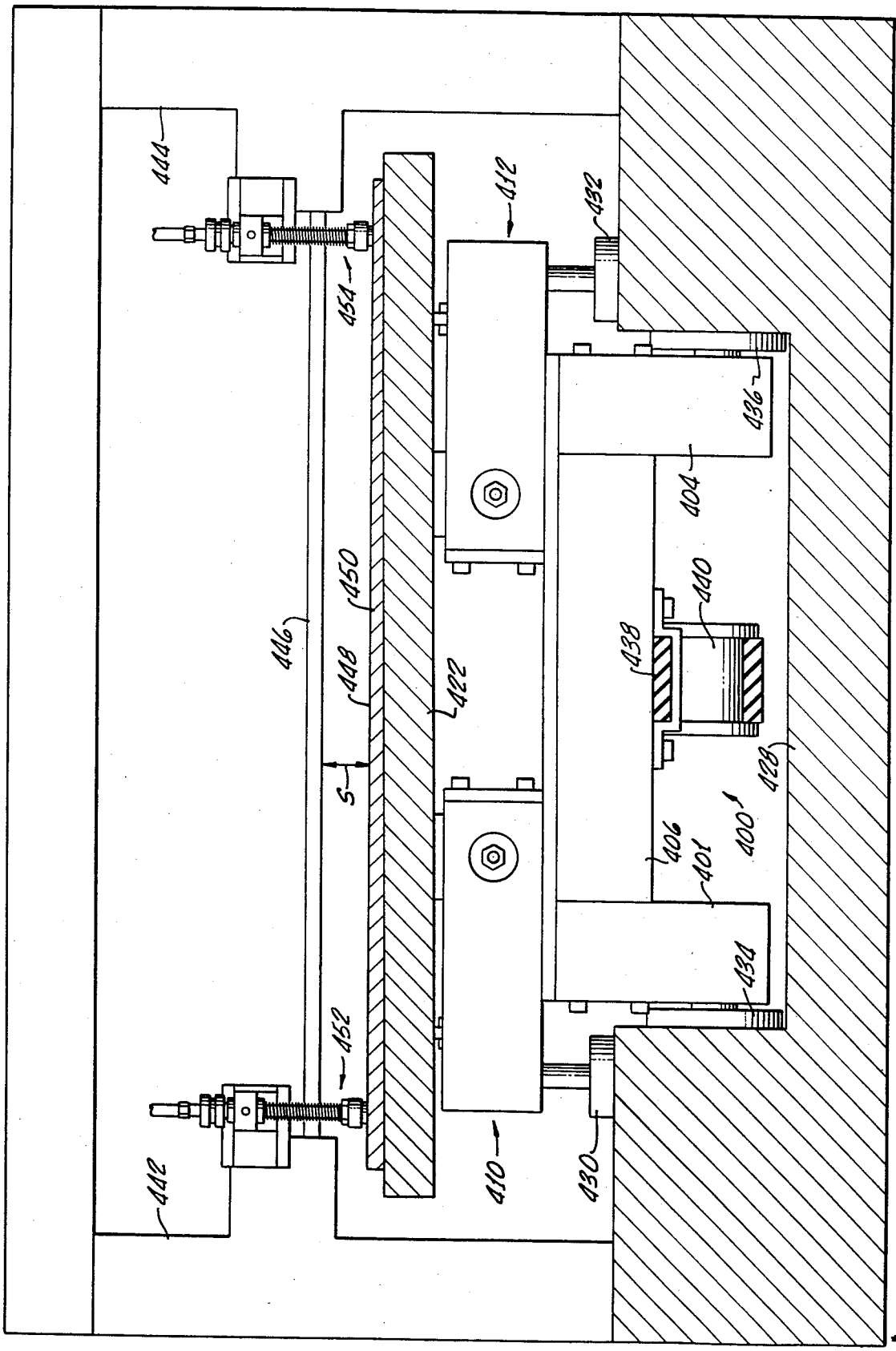
FIG. 13 is a transverse sectional view of still another modified form of the apparatus.
Figure 14:
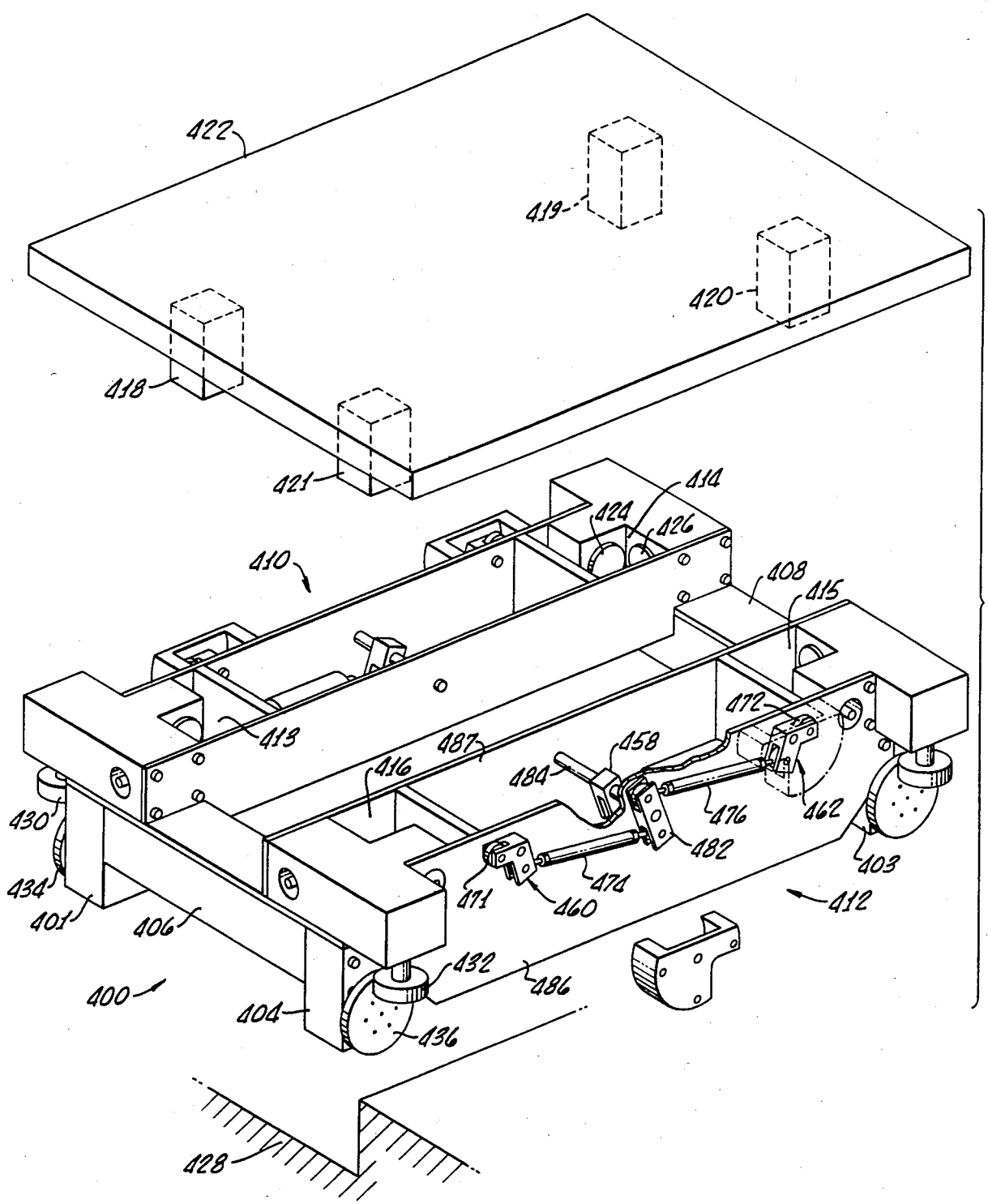
FIG. 14 is an exploded perspective drawing of the carriage and platen of FIG. 13.

An identical arrangement on the other side of the table and platen allows a change in air pressure to the driving air motor to independently raise or lower both front and back of the other side of the platen. Decrease in air pressure to one or the other of the air motors allows the associated side of the platen to be lowered, by action of its own weight and the relatively friction-free vertical guiding of the platen legs. Where the vertical adjustments on the two sides of the platen are operated differentially, the platen will tilt from side to side to accommodate a medium of a thickness that varies transversely, providing a somewhat wedged-shaped medium in transverse cross section. Such a transversely wedge shaped medium is illustrated in FIG. 13, in exaggerated proportions of its thickness variation, and illustrates that the platen side above the table side housing 412 is raised to a greater extent than the platen side above the side housing 410.

As previously mentioned, the thickness variations of the medium are relatively small, up to about 30 mils. Nevertheless, such differential height variation may still require tilting of the platen from side to side. Such tilting may be readily accommodated in the table guideways 413-416 by mounting lateral bearings, such as a bearing 424, for automatic lateral adjustment, so that these bearings will act in the nature of a movable or "spring-loaded" bearing, such as described in connection with bearings 140 and 142 of FIG. 7.

Figure 17:
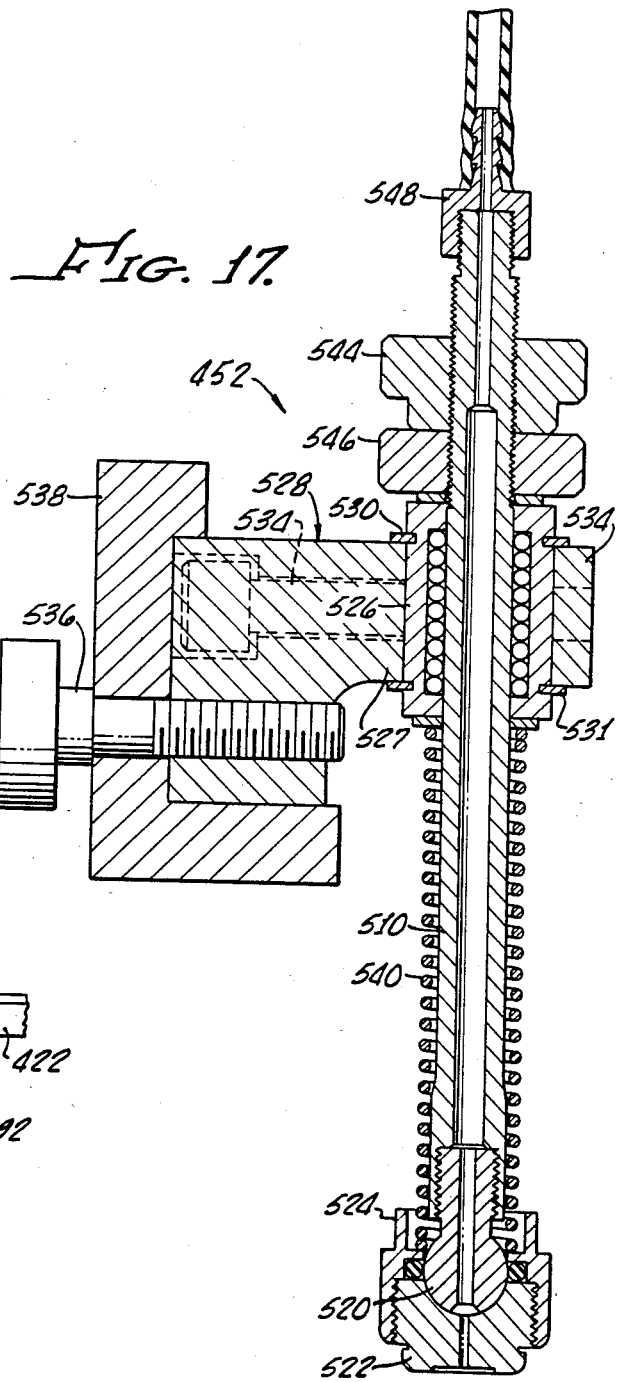
FIG. 17 is a detailed sectional view of a pressure sensor used with the modification of FIGS. 13–16.

Detector 452, which is idential to detector 454, is shown in detail in FIG. 17 and comprises a bored shaft 510 carrying a mounting ball 520 at its lower end. A sensor head 522 is mounted to the ball 520 and held thereon by a retainer nut 524. A ball bushing 526 encircles shaft 510 which is freely slidable longitudinally therein. Bushing 526 is fixedly carried in an aperture of a horizontally-extending arm 527 of a mounting bracket 528 between retainers 530, 531. The ball bushing is fixed to the bracket by means of a set screw 534. Bracket 528 is detachably mounted by a bolt 536 in a structural support angle 538 that is fixedly carried by the fixed wall structure 442.

A spring 540 is compressed between the lower end of ball bushing 526 and the upper end of retainer nut 524, tending to drive the sensor head 522 downwardly toward the upper surface 448 of the scanned medium and allowing the sensor head to be displaced upwardly. A pair of lock nuts 544, 546 threaded on the upper end of the shaft 510 limit downward motion of the shaft through the ball bushing. On the end of the shaft is mounted a nipple 548 that allows a supply of pressurized air to be fed to the bore of shaft 510 which extends completely therethrough to the sensor head 522.

Figure 18:
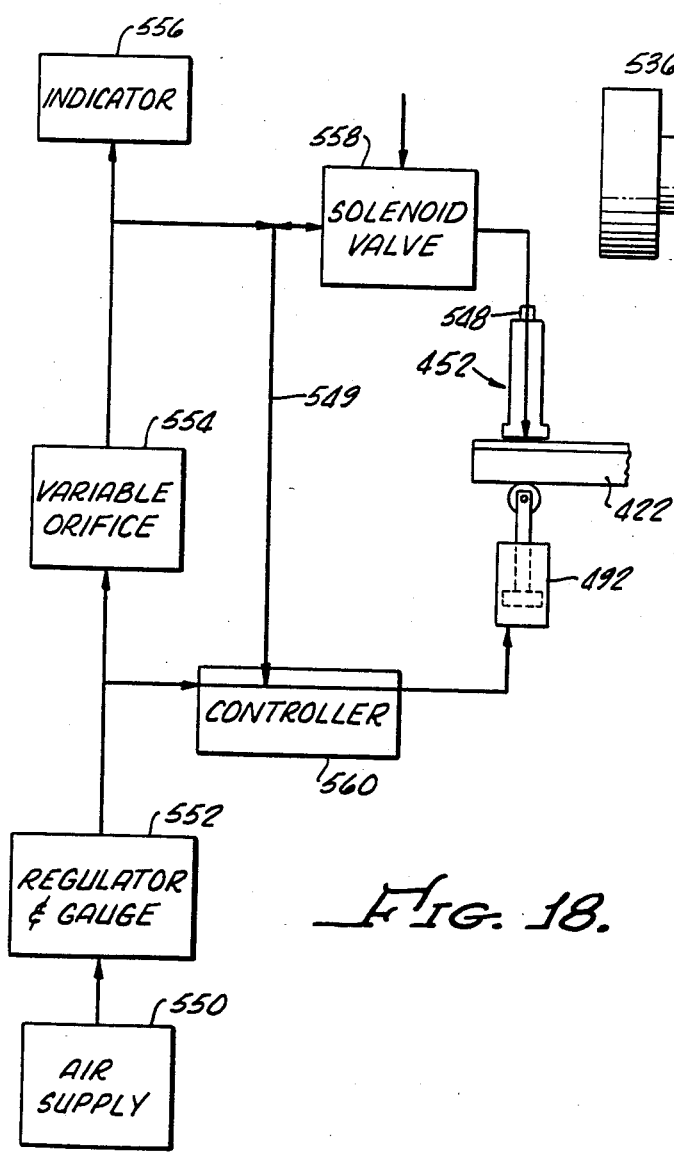
FIG. 18 comprises a pneumatic schematic of the platen height control of the embodiment of FIGS. 13–17.

As illustrated in FIG. 18, gas, such as air under pressure from an air supply 550, is fed via a pressure regulator and gauge 552 and a variable orifice 554, past a pressure indicator 556, and through an up-down solenoid valve 558 which is normally open during operation of the height detector 452. Gas or air under pressure is fed to the nipple 548 of the elevation sensor 452 via the valve 558 and then flows out through the sensor head into the very small gap maintained between the sensor head and the upper surface of the scanned medium. By appropriate adjustment of lock nuts 544, 546, the sensor head is held at a nominal elevation relative to the desired nominal plane of the medium carried on the platen, so that the pressurized air fed through the shaft 510 forms an air film having a thickness nominally in the order of about 0.2 mils.

Pressurized air from the regulator and gage 552 is fed through a proportional integral gas controller 560, which also receives a height feedback signal, via a feedback conduit 549, in the form of pressurized air from valve 558 and elevation sensor 452. An increase in elevation of the upper surface of the scanned medium tends to decrease the air film thickness at the sensor head 522, thereby increasing the pressure of air fed to the detector. The increased pressure is communicated via feedback conduit 549 to the controller 560. The latter commands a decrease in pressure applied via the controller to the gas drive motor 492, thereby allowing the motor piston to retract and allowing the platen to be lowered of its own weight. Conversely, should the height of the scanned medium decrease, the thickness of the air film at the sensor head tends to increase, thereby decreasing the pressure in pressure feedback line 549. Decreased pressure in the feedback line causes increase in pressure supplied by the controller to the air motor to thereby raise the appropriate side of the platen.

In starting the system, the platen and a medium thereon are lowered to allow the medium to be initially positioned below the sensors. The platen may be lowered to its minimum height by closing the solenoid valve 558, to thereby increase the pressure in feedback line 549 and allow the platen to move to its lowest position. With the platen and medium positioned below the height detectors 452 and 454, the solenoid valve is opened to decrease the pressure in the feedback line 549, thereby allowing the height-adjusting mechanism to raise the platen and the scanned medium thereon to a nominal position.

It will be readily appreciated that other types of open loop or closed loop elevation control systems may be employed. Mechanical, electrical, or other types of elevation sensors may be employed to control mechanical, electrical, or other types of height-adjusting mechanisms. One alternative open loop arrangement for maintaining the scanned surface in a fixed nominal plane at the scan path comprises prior measurement of thickness variations of the scanned medium to obtain a height variation profile. The profile is used to produce a program that automatically varies the elevation of the platen according to the previously measured thickness variations.

The foregoing detailed description is to be clearly understood as given by way of illustration and example only, the spirit and scope of this invention being limited solely by the appended claims.

What is claimed is:

1. In a flying spot scanner having a scanning energy beam that strikes a medium surface at impingement points along a scan line, said scan line extending in a first direction, and wherein the medium and energy beam are relatively shifted in a second direction to provide a plurality of successive scan lines mutually spaced along the medium, said scanner being constructed and arranged to provide said impingement points at preselected positions along each of a number of scan lines on a medium surface that lies in a predetermined nominal plane, positions of said points on said scan lines being subject to error caused by deviation of said medium surface from said nominal plane, apparatus for decreasing said error comprising
   means for sensing deviation of said medium surface from said nominal plane at each one of a group of said scan lines, and
   means for shifting said impingement points along each scan line of said group by an amount related to the medium surface deviation sensed for respective ones of the scan lines of said group.

2. The scanner of claim 1 including a reference mask positioned adjacent the scan line of said beam, reference means for scanning said mask in synchronism with said energy beam to develop a beam reference signal, and means for defining position of said scanning energy beam in accordance with said reference signal, said means for sensing and shifting including means for effecting relative displacement of said reference mask and said medium by an amount related to the sensed medium surface deviation to decrease variation of the distance between said reference mask and said medium surface.

3. The scanner of claim 2 wherein said means for sensing and shifting includes means for supporting said reference mask upon said medium surface whereby said reference mask remains at a substantially fixed distance from said medium surface.

4. The scanner of claim 2 including means for mounting said reference mask for motion toward and away from said medium, said means for effecting relative displacement comprising spacer means positioned between said reference mask and said medium surface for maintaining a relatively fixed distance between said mask and medium surface as the surface of said medium deviates from said nominal plane.

5. The scanner of claim 2 including a support, a carriage mounted on the support for motion in said second direction, said reference mask being mounted on said support for motion in a third direction toward and away from said carriage, means for restraining motion of said reference mask in said first and second directions, and spacer means movably engaged with said medium surface and connected to said reference mask for controlling position of said reference mask in said third direction to maintain a substantially fixed distance between said mask and said medium surface.

6. The scanner of claim 2 wherein said reference mask is mounted for tilting and parallel motion in a third direction toward and away from said medium.

7. The scanner of claim 2 including a support, said reference mask being mounted to said support, a carriage mounted to said support for motion in said second direction, said medium being carried by said carriage, said means for effecting relative displacement comprising spacer means between said reference mask and said medium surface, and means for urging said medium and reference mask toward each other with said spacer means interposed therebetween, whereby the distance between said reference mask and medium surface remains substantially fixed as the carriage and medium move in said second direction to position medium sections of different thickness for impingement by said energy beam.

8. A scanning system comprising
means for projecting an energy beam in a scanning path across the surface of a medium upon which an image is to be formed,
a platen for supporting said medium,
means for driving the platen and medium transverse to said scanning path to cause the beam to sweep the medium surface in scans that are successively displaced upon said medium surface,
a reference code member,
means for projecting a reference beam to said code member to scan said code member in synchronism with the scanning of said medium surface by said energy beam,
means responsive to said code member for generating a reference signal,
means for indicating position of said energy beam according to said reference signal, and
means for relatively shifting said reference code member and platen so as to maintain a substantially fixed distance between the code member and said medium surface adjacent said scanning path as said platen and medium are driven transverse to said scanning path.

9. The system of claim 8 wherein said reference code member comprises an elongated mask having a code pattern, and including means for supporting said mask upon said medium surface whereby the mask will shift as said medium surface shifts, means for guiding said mask in its shifting, and means for restraining other motions of said mask.

10. In a flying spot scanner having a scanning beam that sweeps across a medium surface lying in a predetermined nominal plane, and having reference means for generating reference signals for determining position of the beam along its sweep, the method of compensating for error of beam position on the medium surface caused by deviation of said surface from said nominal plane, said method comprising the step of changing the timing of said reference signals in accordance with said surface deviation adjacent the scanning beam sweep so as to shift the position of the beam along its sweep.

11. The method of claim 10 wherein the reference means includes a reference mask and wherein said step of changing the timing comprises displacing the reference mask so as to maintain a substantially fixed distance between the reference mask and the surface of said medium adjacent the scanning beam sweep.

12. The method of scanning the surface of a medium of varying thickness comprising
mounting the medium on a carriage,
moving the carriage in a first direction,
causing a scanning beam to sweep across said medium in a sweep line extending in a second direction angularly related to said first direction,
generating reference signals for determining positions of the intersections of said beam and a nominal sweep line lying in a nominal plane containing the surface of a medium of nominal thickness, and
time shifting said reference signals in accordance with actual deviation of the surface of said medium from said nominal plane adjacent said sweep line.

13. The method of claim 12 wherein said step of generating reference signals comprises directing a scanning reference beam to a reference mask, causing the reference beam to be modulated by the reference mask, and employing the modulated reference beam to generate said reference signals, said step of time shifting said reference signals comprising the step of floating said reference mask upon said medium.

14. The method of claim 12 wherein said step of generating reference signals comprises directing a scanning reference beam to a reference mask, causing the reference beam to be modulated by the reference mask, and employing the modulated reference beam to generate said reference signals, said step of time shifting said reference signals comprising the step of maintaining a substantially fixed distance between said reference mask and the surface of said medium.

15. The method of claim 12 wherein said step of generating reference signals comprises directing a scanning reference beam to a reference mask, causing the reference beam to be modulated by the reference mask, and employing the modulated reference beam to generate said reference signals, said step of time shifting said reference signals comprising the step of displacing said reference mask relative to said medium.

16. A scanning system comprising
a support,
a carriage mounted for motion along said support,
an optical scanning system for projecting an energy beam in a scan path along successive scan lines on the surface of a medium carried by said carriage as the carriage moves along the support, said medium surface moving toward or away from said optical scanning system as the carriage moves,
a reference mask mounted to the support,
an optical system for projecting a scanning reference beam in synchronism with said energy beam across said reference mask, and
means for maintaining the reference mask at a fixed distance from the medium surface at each of said scan lines.

17. The scanning system of claim 16 wherein said reference mask is mounted to said support with freedom of motion toward and away from said carriage, and including means for restraining other motions of said reference mask, said means for maintaining a fixed distance comprising means for detecting position of said medium surface at first and second areas adjacent the scan path of said energy beam, and means responsive to said detecting means for shifting at least one end of the reference mask toward or away from the medium surface.

18. The system of claim 16 wherein said means for maintaining a fixed distance comprises means for mounting said reference mask for freedom of motion toward and away from said medium surface, first and second pressure feet connected to said mask adjacent opposite ends thereof, each said pressure foot having an end thereof in sliding contact with said medium surface, whereby as the medium surface tends to move toward or away from said reference mask the pressure feet cause the reference mask to move away from or toward said medium surface respectively.

19. The system of claim 16 wherein said means for maintaining a fixed distance comprises means for sensing variation of the distance between said reference mask and said medium surface at areas adjacent opposite ends of the scan path of said energy beam, and means for moving said medium surface toward or away from said reference mask to decrease the sensed variations of said distance.

20. The system of claim 16 wherein said means for maintaining a fixed distance comprises means for detecting the distance between said reference mask and said medium surface, means for urging said medium toward said reference mask, and spacer means interposed between the reference mask and the medium surface.

21. The scanning system of claim 16 wherein said means for maintaining the reference mask at a fixed distance from the medium surface at each of said scan lines comprises position detecting means on said support adjacent said scan path for sensing height of the medium surface at the scan path, and means responsive to said position detecting means for moving said medium surface toward or away from said scanning system as the carriage moves along the support.

22. In a flying spot scanner having a scanning energy beam that strikes a medium surface at points along a scan line, said scan line extending in a first direction, and wherein the medium and energy beam are relatively shifted in a second direction to provide a plurality of successive scan lines mutually spaced along the medium, said scanner being constructed and arranged to provide said impingement points at preselected positions along each of a number of scan lines on a medium surface that lies in a predetermined nominal plane, positions of said points on said scan lines being subject to error caused by deviation of said medium surface from said nominal plane as the medium and energy beam are relatively shifted in said second direction, apparatus for decreasing said error comprising means for sensing deviation of said medium surface from said nominal plane at each one of a group of scan lines, and means responsive to the sensed deviation for displacing said medium relative to said nominal plane so as to decrease deviation of the medium surface from the nominal plane at said scan lines.

23. Thickness tracking apparatus for a scanning system that sweeps a scanning beam over transverse areas of the surface of a medium, wherein a medium of varying thickness is mounted to be transported in a nominal plane across the scan sweep of a scanning beam projected to said plane, said apparatus comprising a carriage, a platen mounted on the carriage for motion toward and away from said nominal plane and adapted to carry a medium having a scan surface to be scanned by said beam, means for transporting said carriage parallel to said nominal plane to position different transverse areas of said medium surface at said scan sweep, and means for adjusting said platen relative to the carriage as the carriage is transported so as to maintain each transverse area of said scanned surface that is positioned at said scan sweep at a predetermined distance from said nominal plane.

24. The apparatus of claim 23 wherein said means for adjusting comprises sensing means adjacent said scan sweep for sensing position relative to said nominal plane of transverse means of the scanned medium surface at said scan sweep, and means responsive to said sensing means for moving said platen relative to the carriage.

25. The method of scanning the surface of a medium of varying thickness comprising mounting the medium on a platen, mounting the platen for motion relative to the carriage in a first direction, moving the carriage in a section direction parallel to a nominal plane containing the surface of a medium of nominal thickness, causing a scanning beam to sweep across the surface of a medium in a sweep line extending in a third direction angularly related to said second direction, and moving said platen relative to the carriage in said first direction, while the carriage and platen are moving in said second direction, to decrease deviation from said nominal plane of portions of said medium surface at said sweep line.

26. The method of claim 25 wherein said last-mentioned step comprises the steps of sensing deviation of said medium surface at said sweep line from said nominal plane in said first direction, and moving said platen in response to the sensed deviation.

27. A scanning system comprising a fixed support, a carriage mounted for horizontal motion along the support, a platen mounted for vertical motion on the carriage, sensing means on the support for detecting vertical position of the surface of a medium carried on the platen, means responsive to the sensing means for controlling the vertical position of the platen to reduce variation of detected vertical position of said surface as the carriage is driven horizontally along the support, and means for driving the carriage along the support.

28. The system of claim 27 wherein said sensing means comprises gas bearing means, means for adjustably positioning the bearing means relative to the nominal plane of the surface of a medium carried by said platen, means for supplying gas to the gas bearing means to produce a gas film between the bearing means and said surface, and wherein said means for controlling comprises adjusting means for urging the platen upwardly, and means responsive to pressure of gas supplied to said bearing means for controlling said adjusting means.

29. The apparatus of claim 28 wherein said adjusting means comprises first and second bell cranks pivoted to said carriage at one side thereof and at first leg in supporting contact with one side of said platen and having a second first and second opposite ends thereof, respectively, each bell crank having a leg, a drive link pivoted to said carrage, first and second thrust links interconnected between first and second ends of said drive link and said second legs of said first and second bell cranks, respectively, a gas motor connected between said carriage and said drive link for rotating said drive link to shift said thrust links and rotate said bell cranks, said means for controlling said adjusting means comprising means for actuating said gas motor.

30. The apparatus of claim 27 wherein said sensing means comprises first and second position sensors at first and second sides of said support for independently detecting elevation of first and second sides of the surface of a medium carried by said platen, and wherein said means for controlling comprises first and second adjusting mechanisms each responsive to a respective one of said first and second sensors for independently adjusting elevation of first and second sides of said platen.

* * * * *

UNITED STATES PATENT AND TRADEMARK OFFICE
CERTIFICATE OF CORRECTION

PATENT NO. : 4,585,938

DATED : Apr. 29, 1986

INVENTOR(S) : Neumann et al.

It is certified that error appears in the above-identified patent and that said Letters Patent is hereby corrected as shown below:

Claim 25 (column 20, line 14), delete "section" and substitute therefor ---second---.

Claim 29 (column 20, at lines 59, 60 and 61), delete "leg in supporting contact with one side of said platen and having a second first".

Claim 29 (column 20, line 62), after "a" (first occurrence) and before "leg", insert the following ---first leg in supporting contact with one side of said platen and having a second---.

Signed and Sealed this

Seventeenth Day of February, 1987

Attest:

DONALD J. QUIGG

Attesting Officer     Commissioner of Patents and Trademarks